(12) United States Patent
Pan

(10) Patent No.: US 8,345,519 B1
(45) Date of Patent: Jan. 1, 2013

(54) METHOD AND SYSTEM FOR PROVIDING A SUSPENSION HEAD BOND PAD DESIGN

(75) Inventor: Tzong-Shii Pan, San Jose, CA (US)

(73) Assignee: Western Digital (Fremont), LLC, Fremont, CA (US)

(*) Notice: Subject to any disclaimer, the term of this patent is extended or adjusted under 35 U.S.C. 154(b) by 222 days.

(21) Appl. No.: 12/976,826

(22) Filed: Dec. 22, 2010

(51) Int. Cl.
*G11B 11/00* (2006.01)

(52) U.S. Cl. .................. 369/13.33; 369/112.27

(58) Field of Classification Search ............ 369/13.33, 369/13.32, 13.24, 13.14, 13.03, 13.02, 13.12, 369/13.01, 13.17, 13.35, 112.27, 112.09, 369/112.01; 360/59, 125.31, 125.74, 125.75
See application file for complete search history.

(56) References Cited

U.S. PATENT DOCUMENTS

| 6,404,706 | B1 | 6/2002 | Stovall et al. |
| 6,549,506 | B1 | 4/2003 | Johnson et al. |
| 7,002,780 | B2 | 2/2006 | Rancour et al. |
| 7,113,372 | B2 | 9/2006 | Segar et al. |
| 7,345,840 | B2 | 3/2008 | Gomez et al. |
| 7,532,435 | B2 | 5/2009 | Dugas et al. |
| 2010/0238580 | A1* | 9/2010 | Shimazawa et al. ............ 360/59 |

* cited by examiner

*Primary Examiner* — Ali Neyzari

(57) ABSTRACT

A method and system for providing a head gimbal assembly (HGA) for an energy assisted magnetic recording (EAMR) disk drive including media is described. The HGA includes a slider, a laser assembly, and a flexure. The slider has a front side, a back side, and at least one EAMR transducer residing in proximity to the front side. The front side corresponds to an air-bearing surface (ABS) that resides in proximity to the media during use. The laser assembly includes a laser for providing energy to the EAMR transducer and is mounted on the back side of the slider. The flexure has at least one laser lead and a through-hole therein. The through-hole is configured to accommodate the laser assembly. A portion of the at least one laser lead extends over the through-hole and electrically connects the at least one laser lead with the laser.

21 Claims, 4 Drawing Sheets

Side View

Plan View

METHOD AND SYSTEM FOR PROVIDING A SUSPENSION HEAD BOND PAD DESIGN

BACKGROUND

FIG. 1 depicts a portion of a conventional energy assisted magnetic recording (EAMR) disk drive 10 including recording media 16. For clarity, FIG. 1 is not to scale. The conventional EAMR head 12 includes a slider 14 on which an EAMR transducer 20 is formed. The slider 12 is coupled with a flexure 40, which supports the slider 12 in conjunction with a load beam (not shown). The EAMR transducer 20 is used in writing to the recording media 16. The EAMR transducer 20 receives light, or energy, from a conventional laser 30. The conventional EAMR transducer 20 includes a conventional waveguide, which directs the light toward the media 16, a conventional write pole, which magnetically writes to a region of the media 16 when energized by a coil, and a near-field transducer (NFT) that focuses the light energy onto the media 16. A region of the media 16 is heated. The pole magnetically writes to the heated region of the media 16. The EAMR head 12

Although the conventional EAMR transducer 10 may function, may be desirable to place the laser 30 in a different orientation. For example, the laser 30 may be rotated by ninety degrees. However, the slider 12 is still desired to be coupled with the flexure.

Accordingly, what is needed is a system and method for coupling the EAMR transducer with the flexure.

BRIEF SUMMARY OF THE INVENTION

A method and system for providing a head gimbal assembly (HGA) for an energy assisted magnetic recording (EAMR) disk drive including media is described. The HGA includes a slider, a laser assembly, and a flexure. The slider has a front side, a back side, and at least one EAMR transducer residing in proximity to the front side. The front side corresponds to an air-bearing surface (ABS) that resides in proximity to the media during use. The laser assembly includes a laser for providing energy to the EAMR transducer and is mounted on the back side of the slider. The flexure has at least one laser lead and a through-hole therein. The through-hole is configured to accommodate the laser assembly. A portion of the at least one laser lead extends over the through-hole and electrically connects the at least one laser lead with the laser.

DETAILED DESCRIPTION OF THE EMBODIMENTS OF THE INVENTION

Figure 1:
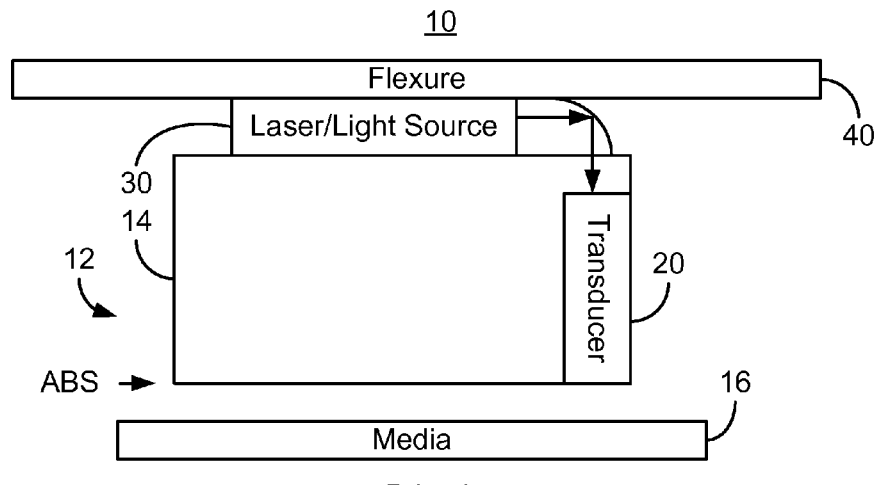
FIG. 1 is a diagram depicting a conventional EAMR disk drive.
Figure 2:
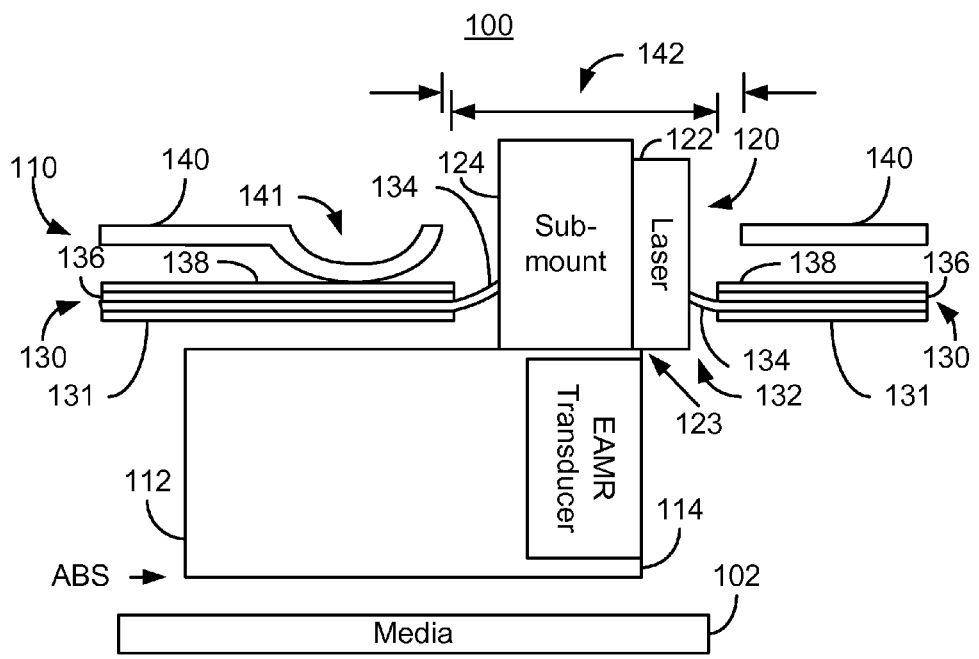
FIG. 2 is a diagram depicting an exemplary embodiment of an EAMR disk drive.

FIG. 2 is a diagram depicting a portion of an EAMR disk drive 100. For clarity, FIG. 2 is not to scale. For simplicity not all portions of the EAMR disk drive 100 are shown. In addition, although the disk drive 100 is depicted in the context of particular components other and/or different components may be used. Further, the arrangement of components may vary in different embodiments. The EAMR disk drive 100 includes media 102, such as a disk, and head-gimbal assembly (HGA) 110. The HGA 110 includes a slider 112, laser assembly 120, flexure 130 and, in at least some embodiments, load beam 140.

The slider 112 has a front side corresponding to the ABS and a back side to which the laser assembly 120 may be mounted. The slider 112 also includes an EAMR transducer 114. The EAMR transducer 114 may include grating(s), waveguide(s), pole(s), write coil(s) and other components used on writing to the media 102. The slider 112 may also include a read transducer (not shown). The laser assembly 120 includes a laser 122 and, in the embodiment shown, optional submount 124. The laser 122 provides energy to the EAMR transducer 114. The submount 124 is mechanically coupled with the laser 122 and the slider 112. In the embodiment shown, the laser assembly 122 mounted on the back side of the slider 112 such that an emitter for the laser 122 is directed toward the EAMR transducer 114. Stated differently, the laser 122 includes light emitting surface 123 that faces the back side of the slider 112 and, therefore, the EAMR transducer 114 Thus, optics between the laser 122 and EAMR transducer 114 may be omitted. However, in another embodiment, the laser 122 may be oriented in another manner.

The flexure 130 is coupled with the load beam 140. The load beam 140 supports the flexure 130 and the slider 112. In addition, the flexure 130 is mechanically and electrically coupled to the laser 122 and submount 124. The flexure 130 includes cover layer 131, through-hole 132, laser leads 134, insulator 136 and stainless 138. The laser 122 fits through the through-hole 132. In the embodiment shown, the through-hole 132 is configured to accommodate the laser assembly 120. Further, a portion of the laser leads 134 extend over the through-hole 132. These leads 134 are electrically connected with the laser 122. In some embodiments, the leads 134 may also be mechanically and/or electrically coupled with the submount 124. The mechanical and electrical connection may be made through solder ball(s) (not shown).

The load beam 140 is shown as including a dimpled portion 141 and beam through-hole 142. In the embodiment shown, the beam through-hole 142 is also configured to accommodate the laser assembly 120. In addition, the beam through-hole 142 is aligned with the through-hole 132 in the flexure 130. Although the dimpled portion 141 is shown as adjoining the beam through-hole 142, in other embodiments, the dimple 141 may be located distal from the beam through-hole 142. As can be seen in FIG. 2, the laser leads 134 extend into the beam through-hole 142.

As can be seen in FIG. 2, the leads 134 bend to accommodate the laser assembly 134. As a result, good electrical and mechanical contact may be made to the laser leads 134. Thus, the HGA 110 may be used in connection with the laser assembly 120 having the laser 122 oriented with its light emitting surface toward the EAMR transducer 114. Consequently, an EAMR disk drive 100 having the desired geometry may be fabricated. Further, connection to the laser 122 by the leads 134 may be made through the submount 124 or the laser 122 itself. Thus, the process for achieving connection to the laser 122 may be more robust. Performance and reliability of the EAMR disk drive 100 may thus be improved.

Figure 3:
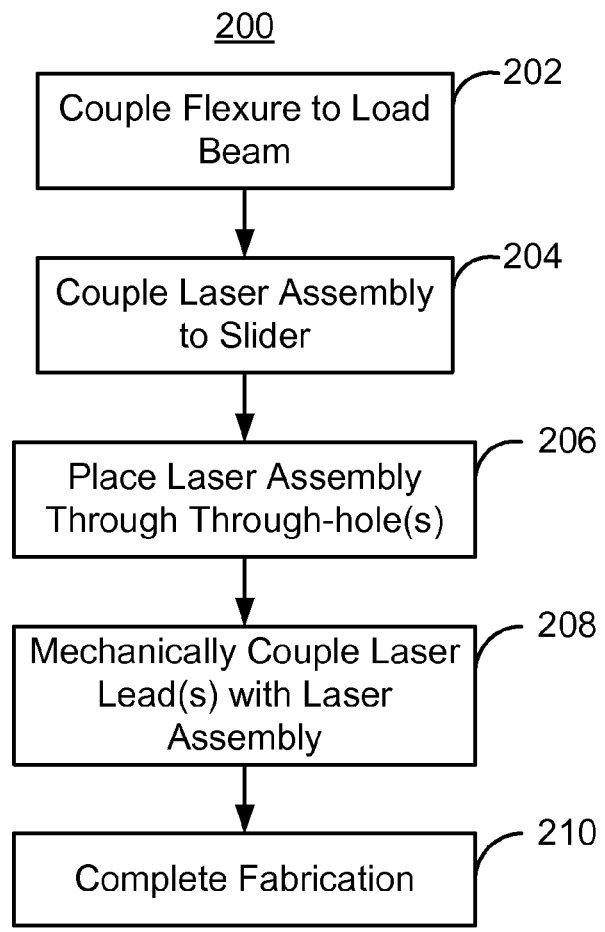
FIG. 3 is a flow chart depicting an exemplary embodiment of a method for assembling an EAMR disk drive.
Figure 4:
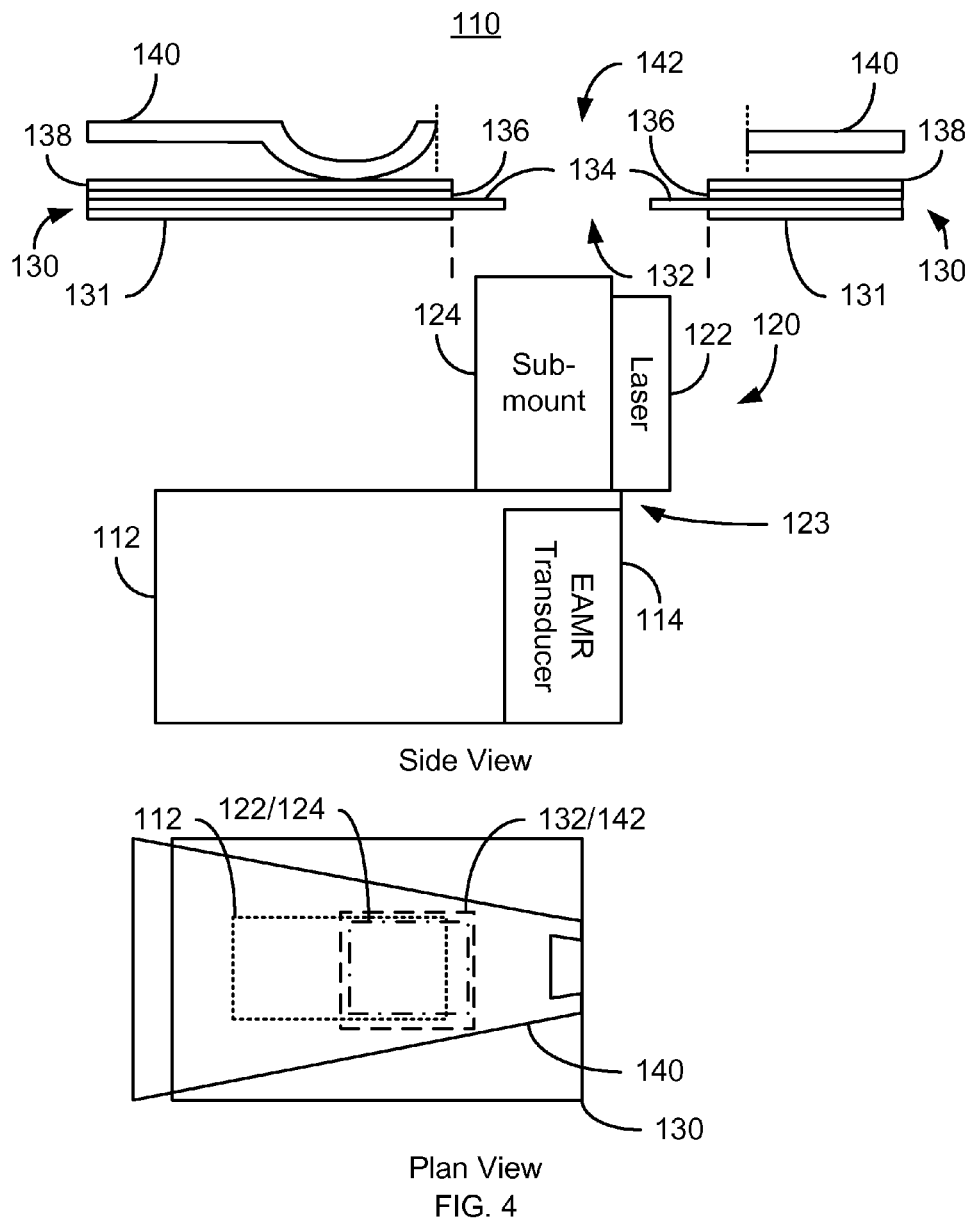
FIGS. 4-6 are diagrams depicting an exemplary embodiment of a laser-slider assembly for use in an EAMR disk drive during assembly.
Figure 5:
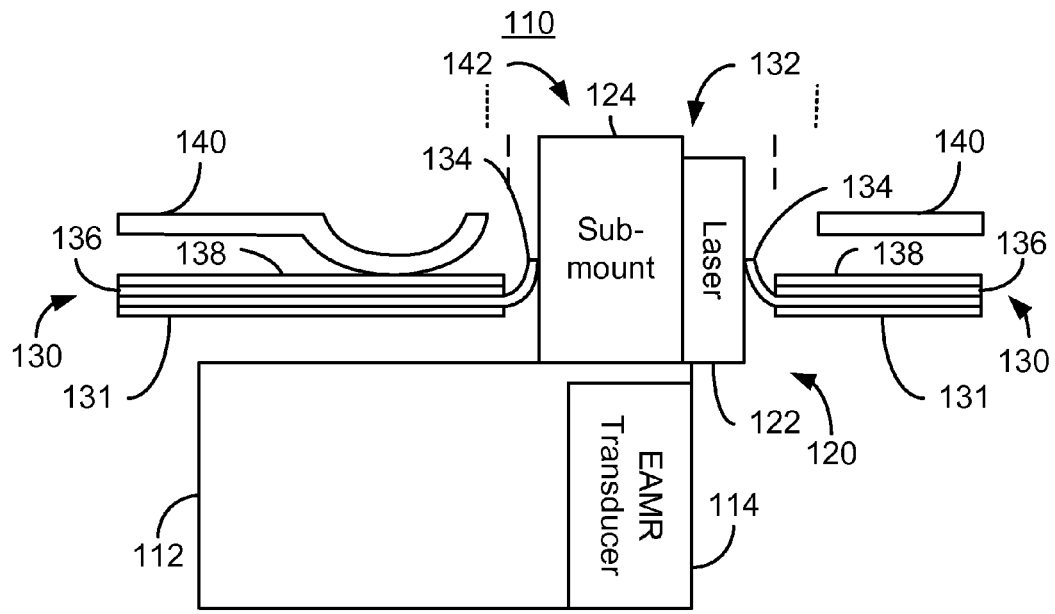
Figure 6:
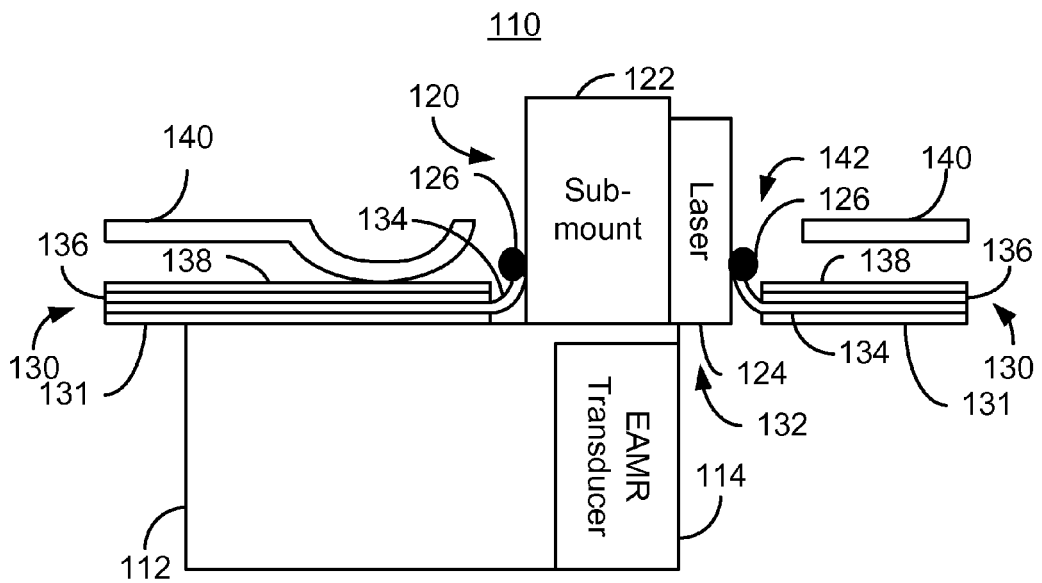

FIG. 3 is a flow chart depicting another exemplary embodiment of a method 200 for assembling an EAMR disk drive. For simplicity, some steps may be omitted. Further, although steps are shown in a particular order, steps may be interleaved, combined, and/or performed in another order. FIGS. 4-6 are diagrams depicting side views of an exemplary embodiment of a portion of an HGA 110 for the EAMR disk drive 100 fabrication. For clarity, FIGS. 4-6 are not to scale. Referring to FIGS. 3-6, the method 200 is described in the context of the HGA 110 and EAMR transducer disk drive 100 in which it resides. However, the method 200 may be used to form another device (not shown). The method 200 is also described in the context of providing a single EAMR disk drive. However, the method 200 may be used to fabricate multiple disk drives at substantially the same time. The method 200 may commence after EAMR transducers have been fabricated on a slider and after a laser assembly has been provided.

FIG. 4 depicts plan and side views of the HGA 110 before the method 200 commences. Thus, slider 112 having EAMR transducer 114 fabricated is shown. Also shown is laser assembly 120, which is to be bonded to the slider 112. The light emitting surface 123 is shown as facing the EAMR transducer 114. The laser assembly 120 includes laser 122 and submount 124. However, in some embodiments, fewer, different and/or additional components may be used. The flexure 130 and load beam 140 have been aligned such that their through-holes 132 and 142, respectively, are aligned. Dashed lines indicate the size of through holes 132 and 142. Thus, in the embodiment shown, the beam through-hole 142 is larger than the through-hole 132 in the flexure. However, in other embodiments, the through-holes 132 and/or 142 may have different sizes. The laser assembly 120 is also shown as aligned with the through-holes 132 and 142 in anticipation of assembly of the HGA 110.

The flexure 130 is coupled to the load beam 140, via step 202. Step 202 includes aligning the through holes 132 and 142 so that the laser assembly will be accommodated by both. The laser assembly 120 is coupled to the slider 112, via step 202. In some embodiments, step 202 includes bonding the laser assembly to the back side of the slider 112.

The laser assembly 120 is placed through the through-hole 132 of the flexure 130, via step 206. Step 206 includes aligning the laser assembly with the through holes 132 and 142. 120 FIG. 5 depicts the HGA 110 during step 206. Thus, the laser assembly 120 penetrates both the flexure and the load beam 140 via through holes 132 and 142, respectively. Although the through hole 132 in the flexure 130 is configured to accommodate the laser assembly 120, the laser leads 134 extend over the through-hole. In addition, as can be seen in FIG. 5, the laser leads 134 bend to accommodate the laser assembly 120. The portion of the laser leads 132 that extend over the through-hole 132 are to be used in electrically connecting the laser leads 132 with the laser 122.

The laser leads 134 are mechanically coupled with the laser assembly 120, via step 208. In some embodiments, step 208 includes applying and reflowing solder balls. However, in other embodiments, solder jet bonding may be used. As such, the solder balls are introduced in liquid form, as the laser leads 134 are being coupled with the laser assembly 120. Note that in the embodiment shown, the leads 134 are coupled to both the submount 124 and the laser 122. FIG. 6 depicts the HGA 110 after step 208 is performed. Consequently, solder balls 126 are shown. Thus, the laser assembly 120 has been mechanically and electrically coupled to the leads 134. Fabrication of the EAMR disk drove may then be completed, via step 210.

Using the method 200, the EAMR disk drive 100 and HGA 110 may be fabricated. As a result, the benefits of the EAMR disk drive 100 may be achieved. For example, performance and/or reliability may be improved.

I claim:

1. A head gimbal assembly (HGA) for an energy assisted magnetic recording (EAMR) disk drive including media, the HGA comprising:
a slider having a front side, a back side, and at least one EAMR transducer residing in proximity to the front side, the front side corresponding to an air-bearing surface (ABS) residing in proximity to the media during use;
a laser assembly including a laser for providing energy to the EAMR transducer, the laser assembly mounted on the back side of the slider; and
a flexure having at least one laser lead and a through-hole therein, the through-hole configured to accommodate the laser assembly, a portion of the at least one laser lead extending over the through-hole and electrically connecting the at least one laser lead with the laser.

2. The HGA of claim 1 wherein the laser includes a light emitting surface, the light emitting surface facing the back side of the slider.

3. The HGA of claim 1 further comprising:
a load beam coupled with the flexure, configured to support the flexure and the slider.

4. The HGA of claim 3 wherein the load beam includes a beam through-hole therein, the beam through-hole being configured to accommodate the laser assembly and substantially aligned with the through-hole.

5. The HGA of claim 4 wherein the at least one laser lead extends into the beam through-hole.

6. The HGA of claim 2 wherein the laser assembly further includes a submount, the laser residing on the submount, the submount being mechanically coupled with the slider, and wherein the at least one laser lead is mechanically coupled to the submount.

7. The HGA of claim 6 further comprising at least one solder ball for mechanically and electrically coupling the at least one laser lead to the submount.

8. The HGA of claim 1 wherein the portion of the at least one laser lead is bent.

9. An energy assisted magnetic recording (EAMR) disk drive comprising:
a media for storing data; and
at least one head-gimbal assembly (HGA), each of the at least one HGA including at least one slider, at least one laser assembly including at least one laser, and at least one flexure, each of the at least one slider having a front side, a back side, and at least one EAMR transducer residing in proximity to the front side, the front side corresponding to an air-bearing surface (ABS) residing in proximity to the media during use, the at least one laser for providing energy to the at least one EAMR transducer and mounted on the back side of the at least one slider, the at least one flexure including at least one laser lead and having a through-hole therein, the through-hole configured to accommodate the at least one laser assembly, a portion of the at least one laser lead extending over the through-hole and electrically connecting the at least one laser lead with the at least one laser.

10. The EAMR disk drive of claim 9 wherein each of the at least one laser includes a light emitting surface facing the back side of the at least one slider.

11. The EAMR disk drive of claim 9 wherein the HGA further includes:
at least one load beam coupled with the at least one flexure, configured to support the at least one flexure and the at least one slider, the at least one load beam including at least one beam through-hole therein, the at least one beam through-hole being configured to accommodate the at least one laser assembly and substantially aligned with the through-hole, the at least one laser lead extending into the beam through-hole.

12. The EAMR disk drive of claim 10 wherein the laser assembly further includes:
   at least one submount on which the at least one laser resides, the at least one submount being mechanically coupled with the at least one slider, the at least one laser lead being mechanically coupled to the at least one submount.

13. The EAMR disk drive of claim 12 further comprising at least one solder ball for mechanically and electrically coupling the at least one laser lead to the at least one submount.

14. The EAMR disk drive of claim 10 wherein the portion of the at least one laser lead is bent.

15. A method for providing head gimbal assembly (HGA) for an energy assisted magnetic recording (EAMR) disk drive including media, the method comprising:
   coupling a laser assembly including a laser to a slider, the slider having a front side, a back side, and at least one EAMR transducer residing in proximity to the front side, the front side corresponding to an air-bearing surface (ABS) residing in proximity to the media during use, the laser for providing energy to the EAMR transducer, the laser assembly being coupled to the back side of the slider; and
   placing the laser assembly through a through-hole of a flexure, the flexure having at least one laser lead and the through-hole therein, the through-hole configured to accommodate the laser assembly, a portion of the at least one laser lead extending over the through-hole and bending to accommodate the laser assembly, the portion of the at least one laser lead extending over the through-hole and electrically connecting the at least one laser lead with the laser; and
   mechanically coupling the at least one laser lead with the laser assembly.

16. The method of claim 15 wherein the laser includes a light emitting surface, and wherein the step of coupling the laser assembly to the slider further includes:
   facing the light emitting surface to the back side of the slider.

17. The method of claim 15 further comprising:
   coupling the flexure to a load beam configured to support the flexure and the slider.

18. The method of claim 17 wherein the load beam includes a beam through-hole therein, the beam through-hole being configured to accommodate the laser assembly, and wherein the step of coupling the flexure to the load beam further includes:
   aligning the beam-through hole with the through-hole of the flexure.

19. The method of claim 15 wherein the laser assembly includes a submount, wherein the laser resides on the submount and wherein the step of coupling the laser to the slider further includes:
   mechanically coupling the submount with the slider.

20. The method of claim 19 wherein at least one solder ball corresponding to the at least one laser lead resides on the flexure and wherein the step of mechanically coupling the laser assembly with the at least one laser lead further includes:
   reflowing the at least one solder ball.

21. The method of claim 19 wherein the step of mechanically coupling the laser assembly with the at least one laser lead further includes:
   performing solder jet bonding.

\* \* \* \* \*